Aug. 22, 1944.   R. W. WAMPLER   2,356,136
APPARATUS FOR HANDLING MIRRORS DURING PROCESSING
Filed July 5, 1941

Inventor
ROY W. WAMPLER,
By Frank Fraser
Attorney

Patented Aug. 22, 1944

2,356,136

UNITED STATES PATENT OFFICE 2,356,136

APPARATUS FOR HANDLING MIRRORS DURING PROCESSING

Roy W. Wampler, Toledo, Ohio, assignor to Libbey-Owens-Ford Glass Company, Toledo, Ohio, a corporation of Ohio Application July 5, 1941, Serial No. 401,225

2 Claims. (Cl. 206—72)

The present invention relates broadly to improvements in the processing of mirrors and more particularly to apparatus for facilitating and expediting the handling thereof.

Although not so limited, this invention has been designed primarily for use in the processing of prismatic rear view mirrors for automotive vehicles and the like of the type comprising a plate of glass of substantially triangular shape in cross section having one side thereof plane and perpendicular with respect to the upper and lower edges of the plate and the other side arranged at a slight angle with respect to the plane side. The plane side of the glass plate is provided with a suitable reflecting medium such as a coating of silver. It has been found that such a mirror is very effective in reducing glare and therefore makes a satisfactory rear view mirror for automotive vehicles and the like.

An important object of the invention is the provision of apparatus which permits the handling and processing of a relatively large number of such mirrors simultaneously, whereby individual handling of the mirror blanks is eliminated and the resultant danger of marring or smudging of the surfaces to be silvered minimized.

Another object of the invention is the provision of apparatus embodying means for supporting a plurality of mirror blanks in proper position relative to one another and with their upper surfaces in a common horizontal plane to facilitate the attachment of a vacuum lifting means thereto for lifting them simultaneously from the supporting means into position for silvering.

Other objects and advantages of the invention will become more apparent during the course of the following description when taken in connection with the accompanying drawing.

In the drawing wherein like numerals are employed to designate like parts throughout the same:

Figure 1:
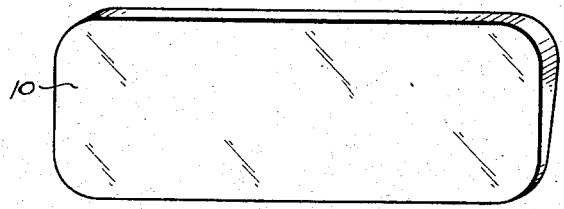
Fig. 1 is a perspective view of a prismatic rear view mirror processed in accordance with the invention.
Figure 2:
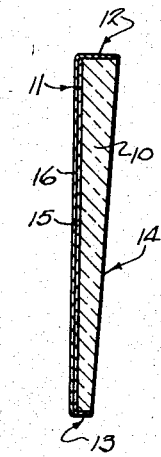
Fig. 2 is a transverse section through the mirror.

With reference now to the drawing, there is shown in Figs. 1 and 2 a prismatic rear view mirror for automotive vehicles comprising a glass plate 10 in the form of a triangular prismoid having a plane back surface 11 extending perpendicular with respect to the upper and lower edges 12 and 13 thereof and a front surface 14 which is arranged at a slight angle with respect to the back surface 11. The back surface 11 is provided with any suitable type of reflecting media, such as a silver coat 15, covered by a protective backing 16 if desired.

Figure 3:
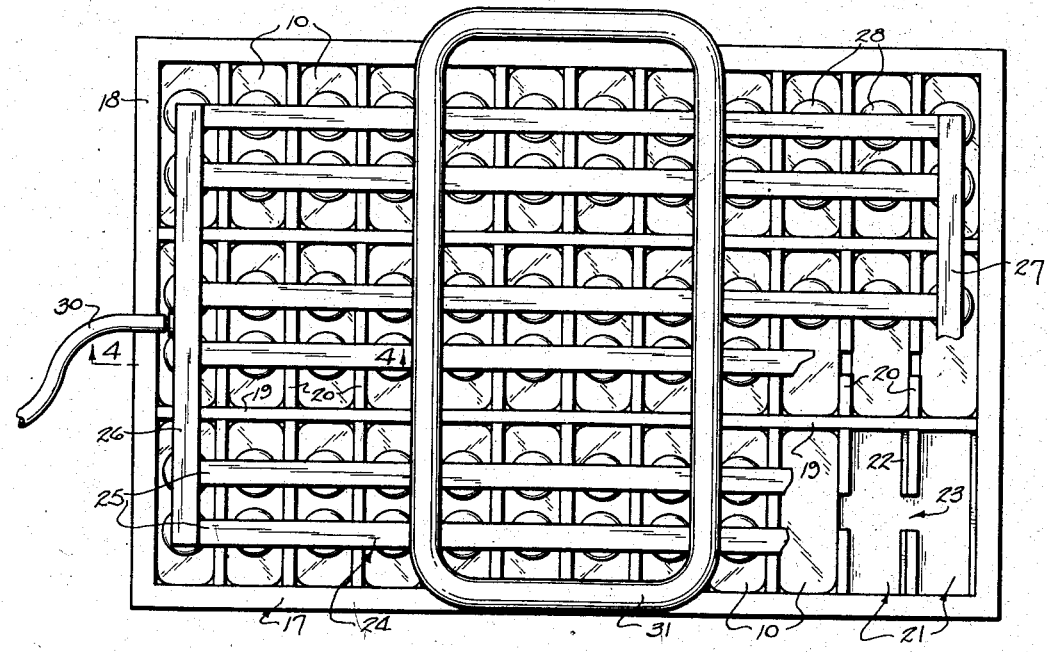
Fig. 3 is a plan view of the supporting means for the mirror blanks and the vacuum lifting means for lifting them therefrom, said lifting means being partially broken away.
Figure 4:
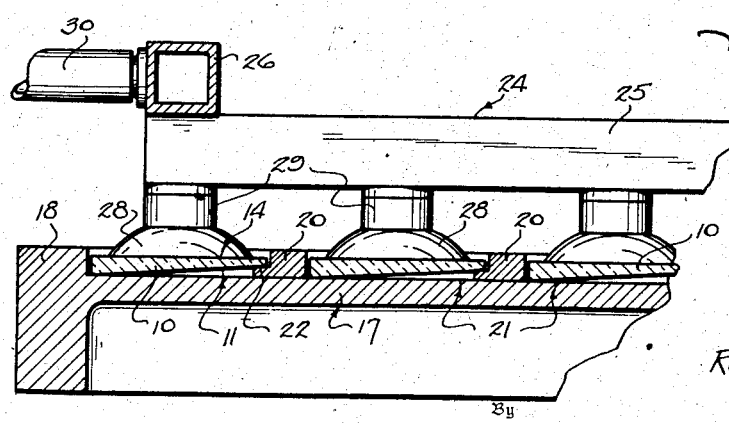
Fig. 4 is a longitudinal section taken substantially on line 4—4 of Fig. 3.

In Figs. 3 to 4 inclusive is illustrated a preferred form of apparatus for handling a plurality of the glass plates 10 simultaneously to facilitate and expedite the processing thereof. The apparatus includes a supporting means comprising a horizontal table 17 provided upon its upper surface and around the perimeter thereof with a rim 18. Extending longitudinally of the table 17 are a plurality of spaced, parallel ribs 19, while extending transversely of said table between adjacent longitudinal ribs 19 are a plurality of spaced, parallel, transverse ribs 20. The transverse ribs 20 cooperate with the longitudinal ribs 19 and rim 18 to provide a plurality of relatively shallow recesses 21 in the upper surface of the table for receiving the glass blanks to be silvered.

As pointed out above, one surface of each glass plate 10 is plane while the opposite surface extends at a slight angle with respect thereto, with the result that the mirror tapers from its upper edge to the lower edge thereof. In order to support the mirror blanks upon the table 17 so that the upper surfaces thereof are horizontally disposed and in a common horizontal plane, each transverse rib 20 is provided upon one side thereof with a ledge 22 for supporting the thinner lower end of the mirror plate, as clearly shown in Fig. 4. Each of the transverse ribs 20 is also provided with a cut-out portion 23 to provide a hand-hold to facilitate the placing of the mirror blanks within the recesses 21 by the operator.

The arranging of the mirror blanks upon the table 17 with their upper surfaces in a common horizontal plane permits the application of a vacuum lifting means thereto so that they can be removed from the table simultaneously. The lifting means consists of a vacuum frame designated in its entirety by the numeral 24 and comprising a plurality of spaced, parallel, longitudinally extending, hollow members 25 connected together at their opposite ends by the hollow cross members 26 and 27 respectively which communicate with said longitudinal members 25. Carried by the longitudinal members 25 are the suction cups 28 secured thereto by the nipples 29. As shown in Fig. 3, a pair of suction cups 28 is provided for each glass blank 10.

Secured to the end member 26 is a conduit 30 leading to a suitable exhausting apparatus (not shown) upon operation of which the air will be withdrawn from the longitudinal members 25 to cause the mirror blanks to be adhered to the cups 28 by suction. When this is done, all of the mirror blanks will be attached to the vacuum frame 24 so that they can be lifted simultaneously from the table. To facilitate the handling of the vacuum frame, it can be provided with a suitable handle 31.

After the mirror blanks have been removed from the table, the outer surfaces thereof are ready to be washed and silvered. While supported on the vacuum frame, the outer surfaces of the mirror blanks are first subjected to the desired washing or cleaning treatment, after which first the reflecting coating 15 and then the protective backing 16, if such is used, are applied.

The reflecting coating 15 preferably consists of a layer of metallic silver applied by spraying a silvering solution upon the glass surface by the general method disclosed in the patent to William Peacock, No. 2,214,476, dated September 10, 1940. In the Peacock method, the silver ammonio nitrate solution and reducing solution are kept in separate containers and, by means of suitable spray equipment, atomized sprays of the two solutions are mixed just prior to deposition upon the surface to be coated. The action of the reducing agent is such that it may be said that instantaneous reduction of the silver ammonio nitrate takes place.

It is to be understood that the form of the invention herewith shown and descibed is to be taken as the preferred embodiment of the same, and that various changes in the shape, size and arrangement of parts may be resorted to without departing from the spirit of the invention or the scope of the subjoined claims.

I claim:

1. An apparatus for handling mirrors during processing, comprising a table provided upon its upper surface with a plurality of longitudinally extending and transversely arranged ribs forming a plurality of recesses for receiving glass plates to be silvered, said glass plates being substantially triangular in cross section, and each of said transverse ribs being provided with a horizontal ledge for supporting the thinner end of the respective glass plate thereon to bring the upper surface of said plate into a horizontal position and the upper surfaces of all of said glass plates in a common horizontal plane to facilitate the application of a vacuum lifting means thereto.

2. An apparatus for handling mirrors during processing, comprising a table provided upon its upper surface with a plurality of longitudinally extending and transversely arranged ribs forming a plurality of recesses having said ribs for their side walls and the upper surface of said table for their bottom walls for receiving glass plates to be silvered, said glass plates being substantially triangular in cross section, one of the walls of each recess being provided with a horizontal ledge having an upwardly facing surface spaced from said bottom wall a distance equal to the difference between the thick and thin ends of said substantially triangular glass plates for supporting the thinner end of the respective glass plate thereon to bring the upper surface of said plate into a horizontal position and the upper surfaces of all of said glass plates in a common horizontal plane to facilitate the application of a vacuum lifting means thereto.

ROY W. WAMPLER.